US008482503B2

(12) United States Patent
Song et al.

(10) Patent No.: US 8,482,503 B2
(45) Date of Patent: Jul. 9, 2013

(54) LIQUID CRYSTAL DISPLAY WITH SEQUENTIAL AND REVERSE SEQUENTIAL SCAN DIRECTION TO IMPROVE DISPLAY QUALITY BY PREVENTING STAINS CAUSED BY POLARIZATION AND ACCUMULATION OF IONS, AND DRIVING METHODS THEREOF

(75) Inventors: Hongsung Song, Gumi-si (KR); Woongki Min, Daegu (KR); Yonggi Son, Milyang-si (KR); Suhyuk Jang, Daegu (KR)

(73) Assignee: LG Display Co., Ltd., Seoul (KR)

( * ) Notice: Subject to any disclaimer, the term of this patent is extended or adjusted under 35 U.S.C. 154(b) by 640 days.

(21) Appl. No.: 12/292,472

(22) Filed: Nov. 19, 2008

(65) Prior Publication Data

US 2009/0273553 A1 Nov. 5, 2009

(30) Foreign Application Priority Data

Apr. 30, 2008 (KR) ........................ 10-2008-0040462

(51) Int. Cl.

| | |
|---|---|
| ***G09G 3/18*** | (2006.01) |
| ***G09G 3/20*** | (2006.01) |
| ***G09G 3/36*** | (2006.01) |
| ***G09G 5/00*** | (2006.01) |
| ***G06F 3/038*** | (2006.01) |
| ***G02F 1/133*** | (2006.01) |

(52) U.S. Cl.

USPC .................. 345/94; 345/53; 345/55; 345/87; 345/88; 345/89; 345/90; 345/91; 345/92; 345/93; 345/95; 345/96; 345/97; 345/98; 345/99; 345/100; 345/204; 345/209; 345/210; 345/211; 345/212; 345/213; 349/33

(58) Field of Classification Search

USPC .......................................................... 345/94

See application file for complete search history.

(56) References Cited

U.S. PATENT DOCUMENTS 4,975,691 A * 12/1990 Lee ................................ 345/79
7,057,598 B2 * 6/2006 Azami et al. .................. 345/100

(Continued)

FOREIGN PATENT DOCUMENTS

CN 101055708 10/2007
DE 195 40 146 A1 5/1996

(Continued)

OTHER PUBLICATIONS

Office Action of Chinese Patent Office in Appl'n No. 200810211472.6, dated Jun. 21, 2001.

(Continued)

*Primary Examiner* — Alexander S Beck
*Assistant Examiner* — K. Kiyabu
(74) *Attorney, Agent, or Firm* — McKenna Long & Aldridge LLP

(57) ABSTRACT

A liquid crystal display and a method of driving the same are disclosed. The liquid crystal display includes a liquid crystal display panel including data lines and gate lines crossing each other and liquid crystal cells, a timing control signal generating unit, a data drive circuit supplying a data voltage to the data lines, and a gate drive circuit. The timing control signal generating unit generates a first gate timing control signal for controlling a scan direction of the liquid crystal display panel in a sequential direction and a second gate timing control signal for controlling the scan direction in a reverse sequential direction. The gate drive circuit supplies a gate pulse to the gate lines while a shift direction of the gate pulse changes in response to the first and second gate timing control signals.

12 Claims, 11 Drawing Sheets

U.S. PATENT DOCUMENTS

| | | | | |
|---|---|---|---|---|
| 7,400,321 | B2 * | 7/2008 | Aiba et al. | 345/204 |
| 7,656,374 | B2 * | 2/2010 | Shen et al. | 345/87 |
| 2002/0196220 | A1 * | 12/2002 | Sato et al. | 345/87 |
| 2003/0038766 | A1 * | 2/2003 | Lee et al. | 345/87 |
| 2005/0156851 | A1 * | 7/2005 | Yun | 345/98 |
| 2005/0225545 | A1 * | 10/2005 | Takatori et al. | 345/204 |
| 2006/0012555 | A1 | 1/2006 | Tokumura | |
| 2006/0119559 | A1 * | 6/2006 | Jung et al. | 345/96 |
| 2006/0238458 | A1 * | 10/2006 | Koyama | 345/76 |
| 2006/0284815 | A1 * | 12/2006 | Kwon et al. | 345/98 |
| 2007/0248204 | A1 * | 10/2007 | Tobita | 377/64 |
| 2008/0136761 | A1 * | 6/2008 | Hong et al. | 345/89 |
| 2008/0158129 | A1 * | 7/2008 | Murakami et al. | 345/98 |
| 2008/0224984 | A1 * | 9/2008 | Chang | 345/100 |

FOREIGN PATENT DOCUMENTS

| | | | |
|---|---|---|---|
| DE | 197 23 204 | A1 | 12/1997 |
| JP | 9-330054 | A | 12/1997 |
| JP | 2005-250382 | | 9/2005 |
| JP | 2006-030529 | | 2/2006 |
| KR | 2001097041 | A * | 11/2001 |
| KR | 2007003117 | A * | 1/2007 |

OTHER PUBLICATIONS

Office Action of Japanese Patent Office in Appl'n No. 2008-260337, dated Jul. 19, 2011.

German Patent Office Action dated Jun. 27, 2012 (w/ English translation).

* cited by examiner

LIQUID CRYSTAL DISPLAY WITH SEQUENTIAL AND REVERSE SEQUENTIAL SCAN DIRECTION TO IMPROVE DISPLAY QUALITY BY PREVENTING STAINS CAUSED BY POLARIZATION AND ACCUMULATION OF IONS, AND DRIVING METHODS THEREOF

This application claims the benefit of Korea Patent Application No. 10-2008-0040462 filed on Apr. 30, 2008, which is incorporated herein by reference for all purposes as if fully set forth herein.

BACKGROUND OF THE INVENTION

1. Field of the Invention

An exemplary embodiment of the invention relates to a liquid crystal display and a method of driving the same.

2. Discussion of the Related Art

Active matrix type liquid crystal displays display a moving picture using a thin film transistor (TFT) as a switching element. The active matrix type liquid crystal displays have been implemented in televisions as well as display devices in portable devices, such as office equipment and computers, because of the thin profile of the active matrix type liquid crystal displays. Accordingly, cathode ray tubes (CRT) are being replaced by active matrix type liquid crystal displays.

The active matrix type liquid crystal display includes data lines and gate lines crossing each other, and liquid crystal cells arranged at each crossing of the data lines and the gate lines in a matrix format. A thin film transistor (TFT) is formed at each crossing of the data lines and the gate lines. As shown in FIG. 1, data driver integrated circuits (ICs) of a liquid crystal display alternately supply a positive data voltage and a negative data voltage to the data lines during a low logic period of a source output enable signal SOE. Gate driver ICs of the liquid crystal display sequentially supply gate pulses synchronized with the positive and negative data voltages to the gate lines during a low logic period of a gate output enable signal GOE. The gate pulses are sequentially supplied to first to n-th gate lines to scan from an uppermost line of the display screen to a lowermost line of the display screen.

If a DC voltage is applied to a liquid crystal layer of the liquid crystal display for a long time, negative ions move in the same vector direction and positive ions move in the same vector direction opposite the vector direction of the negative ions depending on a polarity of an electric field applied to liquid crystals. Hence, the ions inside the liquid crystal layer are polarized. As time elapses, the accumulation of negative ions and the accumulation of positive ions increase. As a result, an alignment layer is degraded and alignment characteristics of the liquid crystal are degraded. In other words, if the DC voltage is applied to the liquid crystal display for a long time, stains appear on a display image, and the stains spread as time elapses.

FIG. 2A shows a mosaic pattern of test data for generating stains in a stain test process. In the mosaic pattern, black gray level blocks with the uniform size and white gray level blocks with the uniform size are alternately positioned upward and downward and right and left. If the liquid crystal display displays the mosaic pattern for a long tine, stains appear in interfaces between the black gray level blocks and the white gray level blocks. Further, as time elapses, the stains spread in a transverse direction. In particular, the stains spreading in the transverse direction, as shown in FIGS. 2A and 2B, appear in the interfaces between the black gray level blocks and the white gray level blocks when the scanning of the data voltages moves from the black gray level blocks to the white gray level blocks, but do not appear when the scanning of the data voltages moves from the white gray level blocks to the black gray level blocks. In FIG. 2B, a line number indicates each line number of the liquid crystal display, namely, a row number of liquid crystal cells, and a numeral inscribed on the black gray level blocks and the white gray level blocks indicates the scan order of the data voltages. The liquid crystal cell adjacent to the liquid crystal cell of the black gray level block is charged to a white gray level voltage while the liquid crystal cell of the black gray level block is hold at a black gray level voltage, and ionic impurities mixed with the adjacent liquid crystal cells are polarized. The polarization adversely affects the alignment layer, and thus the stains appear.

The development of a liquid crystal material with a low dielectric constant or a method for improving an alignment material or an alignment method has been attempted so as to remove the stains. However, the method requires much time and expense to develop the maternal, and a reduction in a dielectric constant of the liquid crystal may cause a reduction in driving characteristics of the liquid crystal. According to the experimental findings, the appearance of the stains due to the polarization and the accumulation of the ions becomes rapider as the amount of impurities ionized inside the liquid crystal layer increases and a value of an acceleration fact increase. The acceleration fact includes a temperature, time, a DC drive of the liquid crystal, and the like. Accordingly, the stains rapidly appear and a stain level increases as a temperature rises or time for which a DC voltage with the same polarity is applied to the liquid crystal layer increases. Furthermore, because levels and shapes of the stains in the same model panels produced through the same production line are different from each other, the stain cannot be solved by the development of new material or an improvement in the manufacturing method.

SUMMARY OF THE INVENTION

Accordingly, the present invention is directed to a liquid crystal display and driving method thereof that substantially obviates one or more of the problems due to limitations and disadvantages of the related art.

An advantage of the present invention is to provide a liquid crystal display and a method of driving the same capable of increasing the display quality by preventing stains.

Additional features and advantages of the exemplary embodiments of the invention will be set forth in the description which follows, and in part will be apparent from the description, or may be learned by practice of the exemplary embodiments of the invention. The objectives and other advantages of the exemplary embodiments of the invention will be realized and attained by the structure particularly pointed out in the written description and claims hereof as well as the appended drawings.

To achieve these and other advantages and in accordance with the purpose of the present invention, as embodied and broadly described, a liquid crystal display comprises a liquid crystal display panel including a plurality of data lines, a plurality of gate lines crossing the data lines, and a plurality of liquid crystal cells, a timing control signal generating unit that generates a first gate timing control signal for controlling a scan direction of the liquid crystal display panel in a sequential direction and a second gate timing control signal for controlling the scan direction of the liquid crystal display panel in a reverse sequential direction, a data drive circuit that supplies a data voltage to the data lines, and a gate drive circuit that supplies a gate pulse to the gate lines while a shift direction of the gate pulse changes in response to the first and second gate timing control signals.

In another aspect of the present invention, a method of driving a liquid crystal display including a liquid crystal display panel including a plurality of data lines, a plurality of gate lines crossing the data lines, and a plurality of liquid crystal cells, a data drive circuit that supplies a data voltage to the data lines, and a gate drive circuit that supplies a gate pulse to the gate lines, the method comprises generating a first gate timing control signal for controlling a scan direction of the liquid crystal display panel in a sequential direction and a second gate timing control signal for controlling the scan direction of the liquid crystal display panel in a reverse sequential direction, and supplying the first and second gate timing control signals to control terminals of the gate drive circuit to supply the gate pulse to the gate lines while a shift direction of the gate pulse changes.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail embodiments of the invention examples of which are illustrated in the accompanying drawings.

Figure 3:
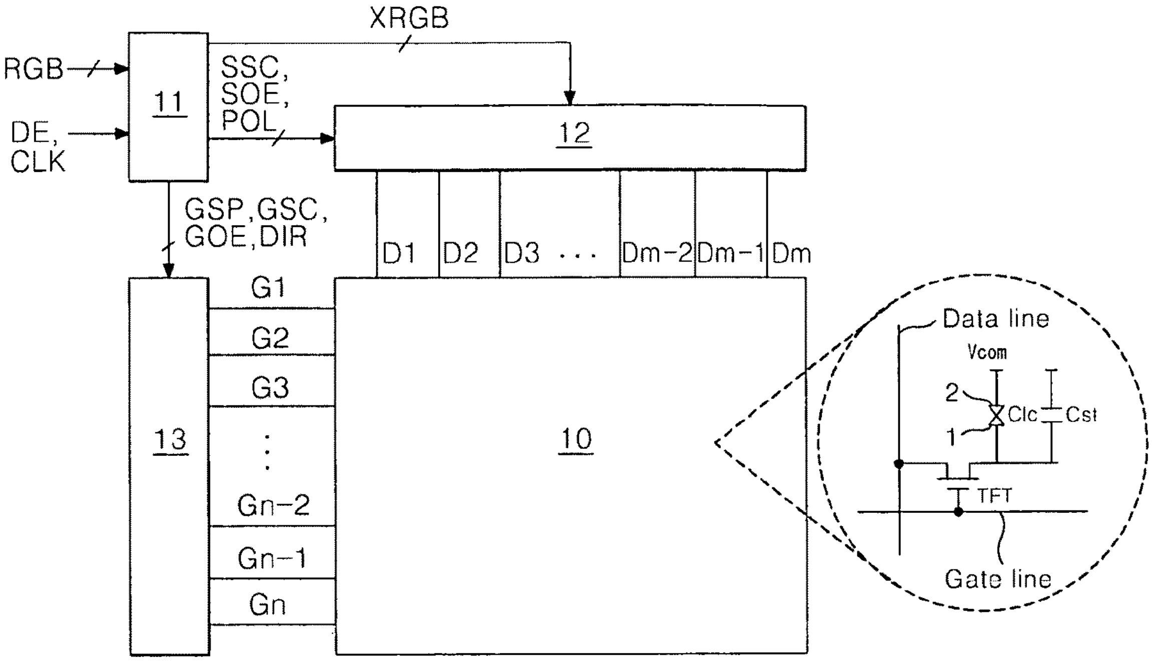
FIG. 3 is a block diagram of a liquid crystal display according to an exemplary embodiment of the invention.

As shown in FIG. 3, a liquid crystal display according to an exemplary embodiment of the invention includes a liquid crystal display panel 10, a timing controller 11, a data drive circuit 12, and a gate drive circuit 13.

The liquid crystal display panel 10 includes an upper glass substrate, a lower glass substrate, and a liquid crystal layer between the upper and lower glass substrates, all not shown. The lower glass substrate of the liquid crystal display panel 10 includes m data lines D1 to Dm and n gate lines G1 to Gn crossing each other. The liquid crystal display panel 10 includes m×n liquid crystal cells Clc arranged in a matrix format at each crossing of the m data lines D1 to Dm and the n gate lines G1 to Gn. The lower glass substrate further includes a thin film transistor TFT, a pixel electrode 1 of the liquid crystal cell Clc connected to the thin film transistor TFT, and a storage capacitor Cst.

The upper glass substrate of the liquid crystal display panel 10 includes a black matrix, a color filter, and a common electrode 2. The common electrode 2 is formed on the upper glass substrate in a vertical electric drive manner, such as a twisted nematic (TN) mode and a vertical alignment (VA) mode. The common electrode 2 and the pixel electrode 1 are formed on the lower glass substrate in a horizontal electric drive manner, such as an in-plane switching (IPS) mode and a fringe field switching (FFS) mode. Polarizing plates each having optical axes that cross at a right angle are attached respectively to the upper and lower glass substrates. Alignment layers for setting a pre-tilt angle of the liquid crystal in an interface contacting the liquid crystal are respectively formed on the upper and lower glass substrates.

The timing controller 11 supplies digital video data XRGB to the data drive circuit 12. The timing controller 11 receives timing signals such as a data enable signal DE and a dot clock signal CLK, and generates a data timing control signal for controlling operation timing of the data drive circuit 12 and a gate timing control signal for controlling operation timing of the gate drive circuit 13.

The data timing control signal includes a source start pulse SSP, a source sampling clock signal SSC, a source output enable signal SOE, and a polarity control signal POL. The source start pulse SSP indicates a start pixel in 1 horizontal line to which data will be displayed. The source sampling clock signal SSC controls a data latch operation inside the data drive circuit 12 based on a rising or falling edge. The source output enable signal SOE directs an output of the data drive circuit 12. A logic state of the polarity control signal POL is inverted every scan time of 1 line or scan time of 2 lines, and a phase of the polarity control signal POL is inverted in each frame period. The polarity control signal POL controls a polarity of a data voltage to be supplied to the liquid crystal cells Clc of the liquid crystal display panel 10.

The gate timing control signal includes a gate start pulse GSP, a gate shift clock signal GSC, a gate output enable signal GOE, a scan direction control signal DIR, and the like. The gate start pulse GSP indicates a scan start line (or a row of the liquid crystal cell) of a scan operation during 1 vertical period in which one screen is displayed. The gate shift clock signal GSC is a timing control signal that is input to a shift resistor installed in the gate drive circuit 13 to sequentially shift the gate start pulse GSP, and has a pulse width corresponding to a turned-on period of the thin film transistor TFT. The gate output enable signal GOE directs an output of the gate drive circuit 13. The scan direction control signal DIR controls a shift direction of the scan pulses.

The timing controller 11 does not multiply a driving frequency of the liquid crystal display panel 10 and periodically controls a scan direction of the liquid crystal display panel 10.

The timing controller 11 controls the scan direction of the liquid crystal display panel 10 in a sequential direction of lines, and periodically controls the scan direction of the liquid crystal display panel 10 in zigzag or in a reverse sequential direction of lines during even-numbered frame periods. The scan direction may change every N frame periods or every N seconds, where N is a positive integer. For this, the timing controller 11 generates the scan direction control signal DIR periodically having a different pattern. When the scan direction control signal DIR is generated in a low logic state, the liquid crystal display panel 10 is scanned in the sequential direction of lines. When the scan direction control signal DIR is generated in a high logic state, the liquid crystal display panel 10 is scanned in the reverse sequential direction of lines.

The timing controller 11 multiplies the driving frequency of the liquid crystal display panel 10 by N, and thus can periodically control the scan direction of the liquid crystal display panel 10.

The data drive circuit 12 includes a plurality of data driver integrated circuits (ICs). Each of the data driver ICs includes a shift resistor, a latch, a digital-to-analog converter, a buffer, and the like. The data drive circuit 12 latches the digital video data XRGB under the control of the timing controller 11 and converts the digital video data XRGB into analog positive and negative gamma compensation voltages to supply the analog positive and negative gamma compensation voltages to the data lines D1 to Dm. The data drive circuit 12 inverts a polarity of the data voltage in response to the polarity control signal POL.

Figure 4:
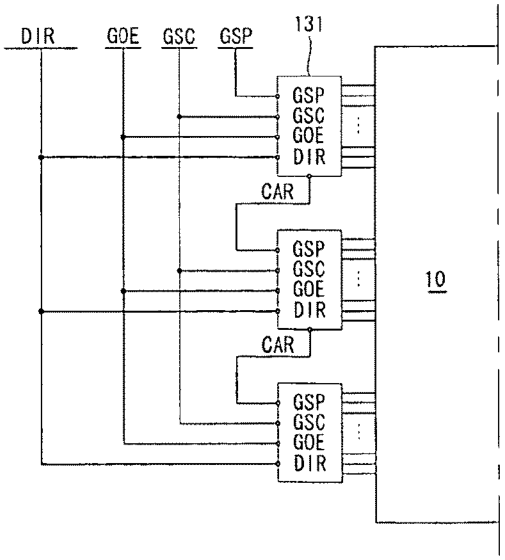
FIG. 4 shows gate driver integrated circuits (ICs) of a gate drive circuit shown in FIG. 3.

The gate drive circuit 13, as shown in FIG. 4, includes a plurality of gate driver ICs 131. The gate drive circuit 13 includes a shift register, a level shifter for converting an output signal of the shift resistor into a signal having a swing width suitable for a TFT drive of the liquid crystal cell Clc, and an output buffer, all not shown. While the gate drive circuit 13 shifts gate pulses (or scan pulses) upward or downward depending on a logic state of the scan direction control signal DIR, the gate drive circuit 13 outputs the gate pulses. In other words, while the gate driver ICs 131 shift the gate pulses in the sequential direction from the top to the bottom of the screen in response to the scan direction control signal DIR received from the timing controller 11, the gate driver ICs 131 output the gate pulses. Otherwise, while the gate driver ICs 131 shift the gate pulses in the reverse sequential direction from the bottom to the top of the screen, the gate driver ICs 131 output the gate pulses. In FIG. 4, "CAR" indicates a carry signal, that is generated in one gate driver IC 131 and then transmitted to the next gate driver IC 131, among the other gate driver ICs 131 except the first gate driver IC 131 first outputting the gate pulse. The carry signal CAR serves as a gate state pulse of the other gate driver ICs 131 except the first gate driver IC 131.

The gate driver ICs 131 are dividedly attached at the left and right sides of the liquid crystal display panel 10 so as to reduce the delay and the voltage drop of the gate pulses in the large-sized liquid crystal display panel 10, and thus the gate driver ICs 131 at both sides of the gate lines can simultaneously apply the gate pulses to the gate lines. In this case, because the liquid crystal display panel 10 is scanned in the sequential direction, the gate driver ICs 131 at the left side of the liquid crystal display panel 10 shift the gate pulses in the sequential direction and output the gate pulses, but the gate driver ICs 131 at the right side of the liquid crystal display panel 10 shift the gate pulses in the reverse sequential direction and output the gate pulses because a direction of output terminals of the gate driver ICs 131 changes. The scan direction control signal DIR is fixed at a predetermined voltage or a predetermined logic level so as to achieve the above-described propose. On the contrary, the liquid crystal display according to the exemplary embodiment of the invention periodically inverts a logic level of the scan direction control signal DIR, and thus allows the gate driver ICs 131 to alternately control a shift direction of the gate pulses in the sequential direction and the reverse sequential direction.

Figure 5:
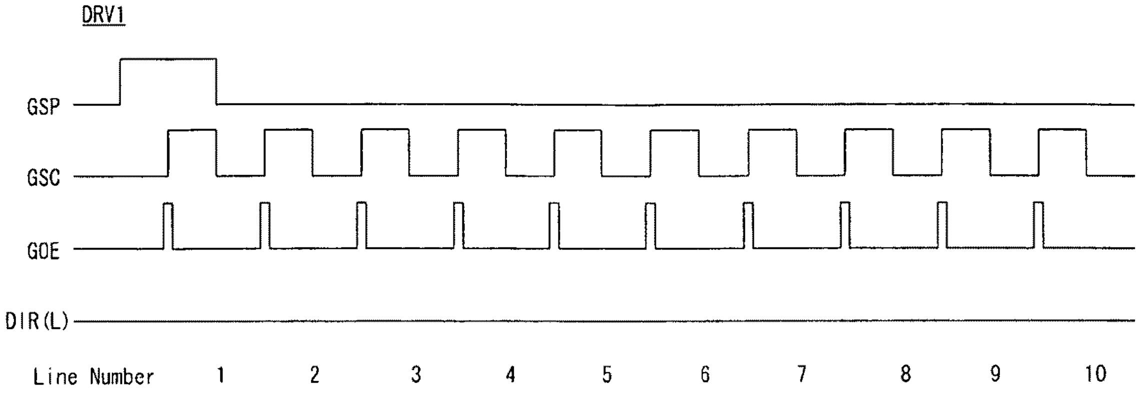
FIG. 5 is a waveform diagram of a first gate timing control signal.
Figure 6A:
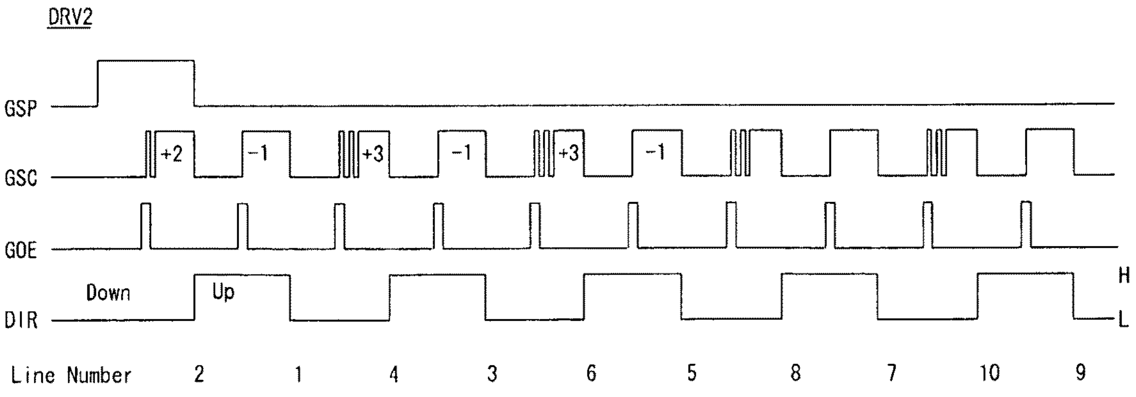
FIG. 6A is a waveform diagram of a second gate timing control signal.

The liquid crystal display and the method of driving the same according to the exemplary embodiment of the invention alternately apply a first gate timing control signal DRV1 shown in FIG. 5 and a second gate timing control signal DRV2 shown in FIG. 6A to the gate driver ICs 131 of the gate drive circuit 13. As described above, a driving period of the liquid crystal display panel 10 driven by the second gate timing control signal DRV2 is N frame periods or N seconds. Accordingly, the liquid crystal display panel 10 is scanned in the sequential direction in response to the first gate timing control signal DRV1, and a scan direction of the liquid crystal display panel 10 changes in response to the second gate timing control signal DRV2 every N frame periods or N seconds.

FIG. 5 is a waveform diagram of the first gate timing control signal DRV1.

As shown in FIG. 5, the first gate timing control signal DRV1 is a control signal for controlling a scan direction of the liquid crystal display panel 10 in the sequential direction.

In the first gate timing control signal DRV1, a gate start pulse GSP is once generated in the initial of 1 frame period when scan time starts. A pulse of a gate shift clock signal GSC is generated every 1 horizontal period and the generation number of pulses of the gate shift clock signal GSC is equal to the number of gate lines. A gate output enable signal GOE is generated in synchronization with a rising edge of the gate shift clock signal GSC. A scan direction control signal DIR is maintained in a low logic state.

The gate driver ICs 131 of the gate drive circuit 13 shift the gate pulses synchronized with the positive and negative data voltages in pulses of the gate shift clock signal GSC in the sequential direction, namely, in a shift direction from the top to the bottom in response to the scan direction control signal DIR of the low logic state, and sequentially supply the gate pulses to the gate lines G1 to Gn. Accordingly, if the first gate timing control signal DRV1 is generated, the gate pulse is supplied to the first gate line G1, and then the gate pulses are sequentially supplied to the second to n-th gate lines G2 to Gn. If the liquid crystal display panel 10 is scanned by the first gate timing control signal DRV1 and displays the test data of the mosaic pattern shown in FIG. 2A, the scan direction of the liquid crystal display panel 10 is the same as the scan direction shown in FIG. 2B.

Figure 6B:
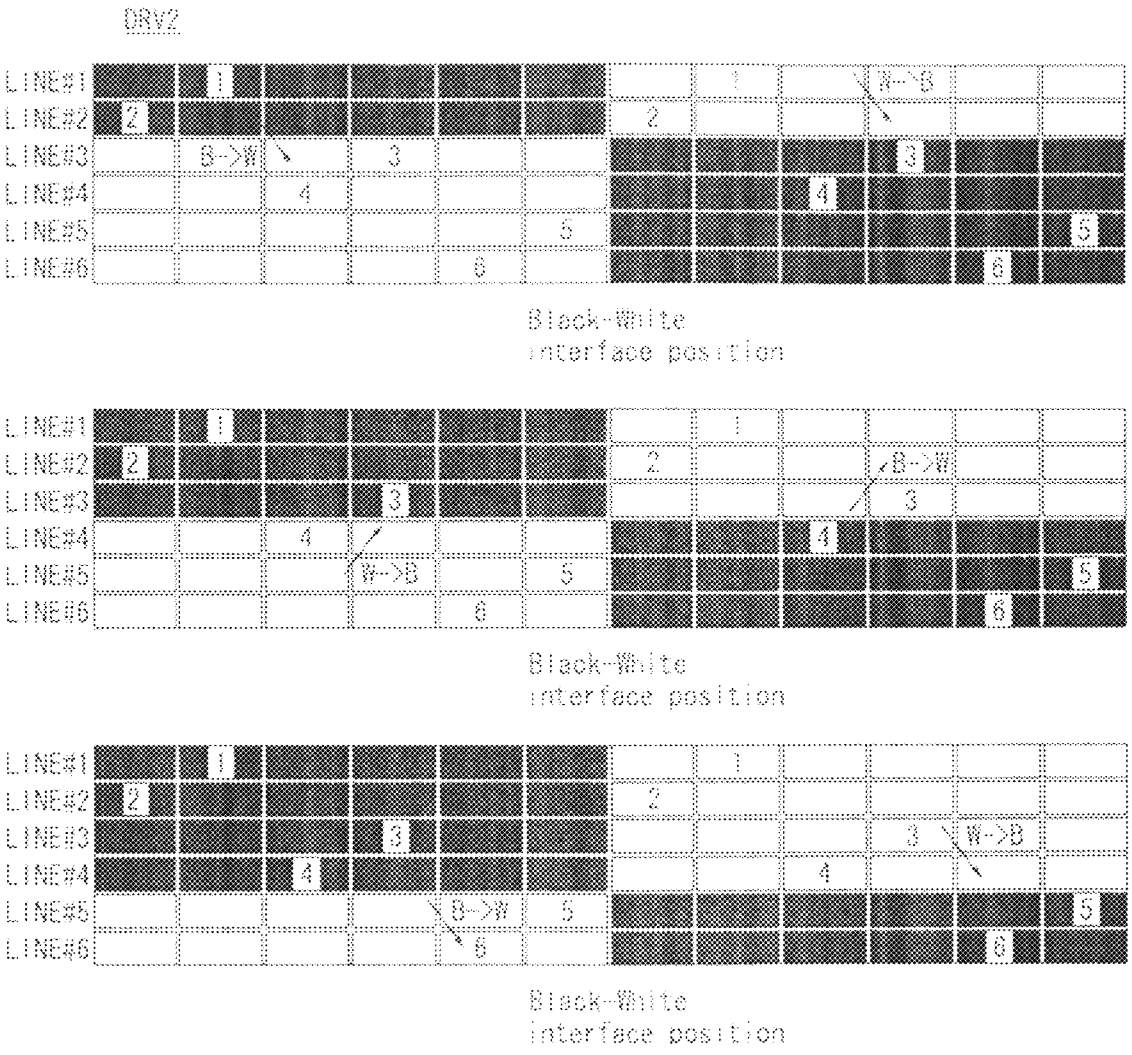
FIG. 6B shows a scan direction of a liquid crystal display panel driven by the second gate timing control signal of FIG. 6A when test data of a mosaic pattern is displayed on the liquid crystal display panel.

FIG. 6A is a waveform diagram of the second gate timing control signal DRV2. FIG. 6B shows a scan direction of the liquid crystal display panel 10 driven by the second gate timing control signal DRV2 when test data of a mosaic pattern is displayed on the liquid crystal display panel 10.

As show in FIG. 6A, the second gate timing control signal DRV2 is a control signal for alternately scanning the liquid crystal display panel 10 in the sequential direction and the reverse sequential direction.

In the second gate timing control signal DRV2, a gate start pulse GSP is once generated in the initial of 1 frame period when scan time starts. In a gate shift clock signal GSC, one pulse with a short width and one pulse with a long width are generated within a first horizontal period. Sequentially, after one pulse with a long width is generated within a second horizontal period, two pulses with a short width and one pulse with a long width are generated within a third horizontal period. Then, in the gate shift clock signal GSC, the pulse waveform generated during the second and third horizontal periods is repeatedly generated during horizontal periods following the third horizontal period. A gate output enable signal GOE is generated in synchronization with a rising edge of the gate shift clock signal GSC. A scan direction control signal DIR is generated in a low logic state during odd-numbered horizontal periods and is generated in a high logic state during even-numbered horizontal periods. A pulse width of the scan direction control signal DIR is larger than a pulse width of the gate shift clock signal GSC and has a pulse width corresponding to 1 horizontal period. A second half portion of each of pulses of the scan direction control signal DIR overlaps the long pulses of the gate shift clock signal GSC generated during the even-numbered horizontal periods and pulses of the gate output enable signal GOE generated during the even-numbered horizontal periods.

When the scan direction control signal DIR is generated in a low logic state, the gate drive circuit 13 shifts the gate pulses in the sequential direction from the top to the bottom of the screen. When the scan direction control signal DIR is generated in a high logic state, the gate drive circuit 13 shifts the gate pulses in the reverse sequential direction from the bottom to the top of the screen. The number of shift operations of the gate pulses is equal to the number of pulses of the gate shift clock signal GSC generated during 1 horizontal period. Accordingly, if the scan direction control signal DIR and the gate shift clock signal GSC are generated as shown in FIG. 6A, the gate drive circuit 13 shifts the gate start pulse GSP 2 times in the sequential direction during the first horizontal period and supplies the gate pulse to the second gate line G2. Sequentially, after the gate drive circuit 13 shifts the gate pulse once in the reverse sequential direction during the second horizontal period and supplies the gate pulse to the first gate line G1, the gate drive circuit 13 shifts the gate pulse three times in the sequential direction during the third horizontal period and supplies the gate pulse to the fourth gate line G4. Then, the gate drive circuit 13 shifts the gate pulse once in the reverse sequential direction during the fourth horizontal period and supplies the gate pulse to the third gate line G3. After the gate drive circuit 13 shifts the gate pulse three times in the sequential direction during a horizontal period and supplies the gate pulse to the n-th gate line Gn, the gate drive circuit 13 shifts the gate pulse once in the reverse sequential direction during a next horizontal period and supplies the gate pulse to the (n−1)-th gate line Gn−1.

Figure 1:
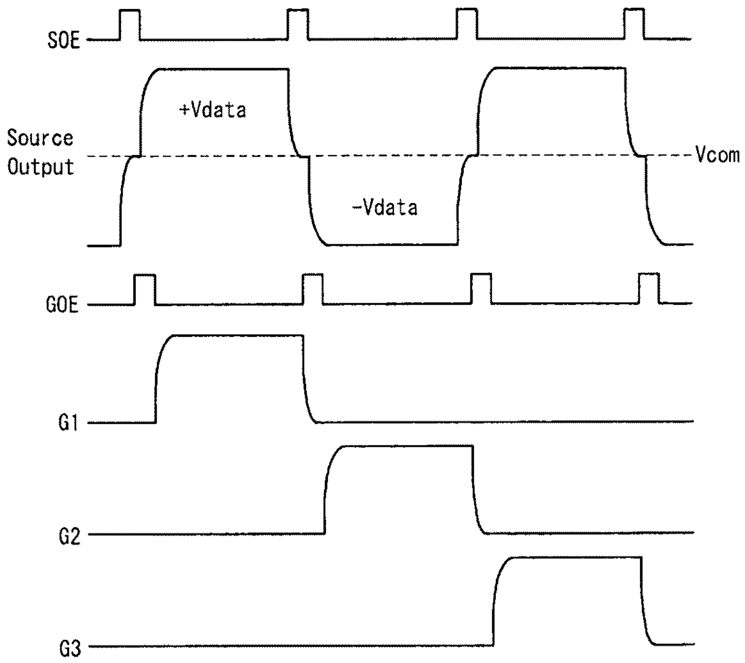
FIG. 1 (Related Art)
FIG. 1 is a waveform diagram of a driving signal of a general liquid crystal display.
Figure 2A:
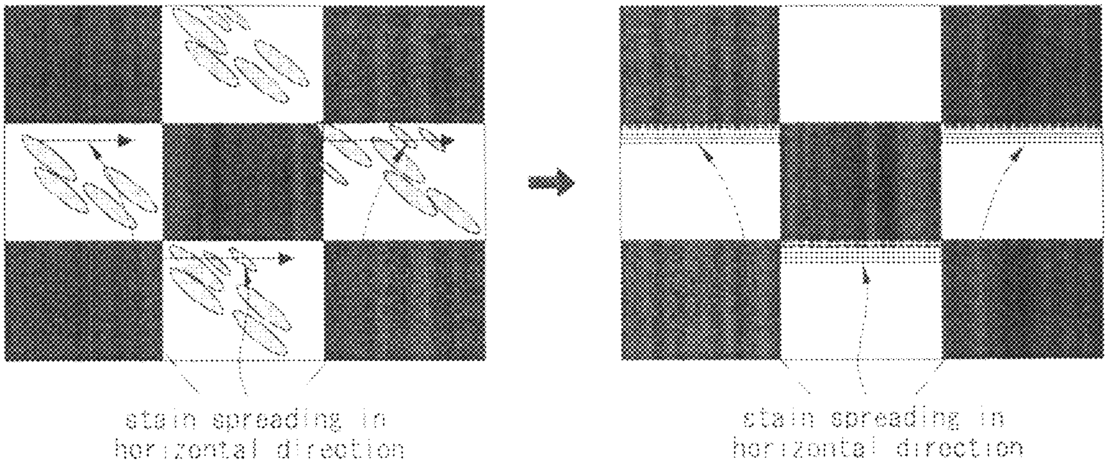
FIG. 2A (Related Art)
FIG. 2A shows a mosaic pattern of test data for generating stains and stains spreading in a transverse direction.
Figure 2B:
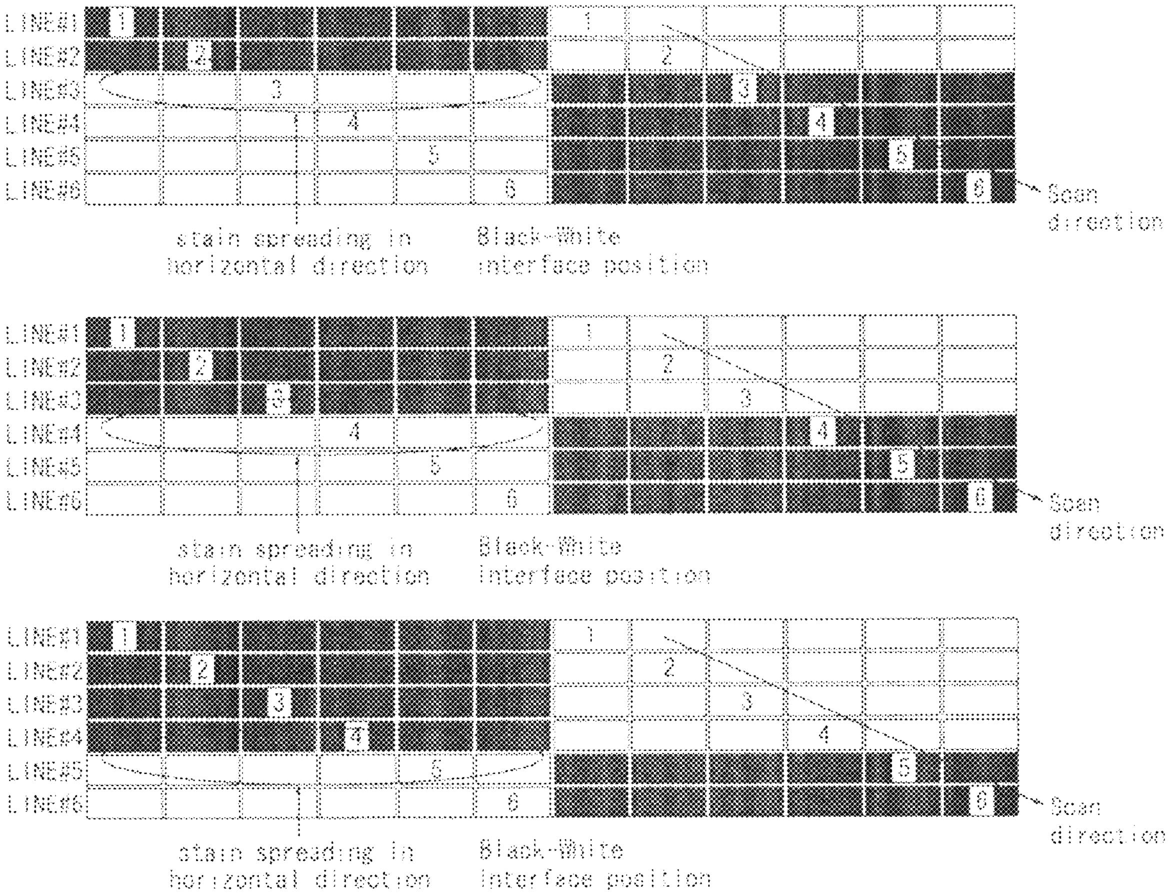
FIG. 2B (Related Art)
FIG. 2B shows a location of stains when interfaces between black gray level blocks and white gray level blocks move in the mosaic pattern of FIG. 2A.

Because the liquid crystal display and the method of driving the same according to the exemplary embodiment of the invention scans the liquid crystal display panel 10 while the scan direction of the liquid crystal display panel 10 changes every N frame periods or N seconds, the data voltage is shifted from a white gray level block to a black gray level block in an interface between the black gray level block and the white gray level block even if the liquid crystal display displays the mosaic pattern shown in FIG. 2A for a long time. As a result, the liquid crystal display and the method of driving the same according to the exemplary embodiment of the invention supply the gate pulses to the gate lines while the shift direction of the gate pulses changes, and thus can suppress the polarization of impurity ions inside the liquid crystal layer and can prevent the stains and the stain spreading.

Figure 7A:
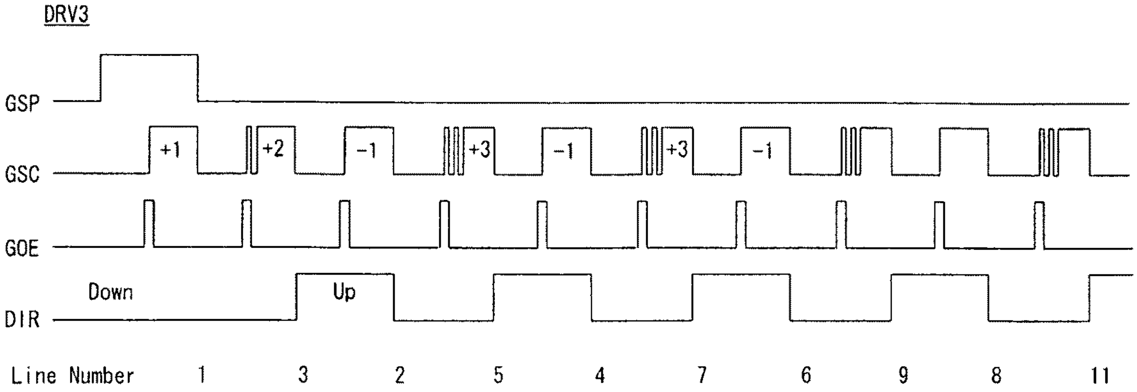
FIG. 7A is a waveform diagram of a third gate timing control signal.

The liquid crystal display and the method of driving the same according to the exemplary embodiment of the invention alternately apply the first gate timing control signal DRV1 shown in FIG. 5 and a third gate timing control signal DRV3 shown in FIG. 7A to the gate driver ICs 131 of the gate drive circuit 13. As described above, a driving period of the liquid crystal display panel 10 driven by the third gate timing control signal DRV3 is N frame periods or N seconds. Accordingly, the liquid crystal display panel 10 is scanned in the sequential direction in response to the first gate timing control signal DRV1, and a scan direction of the liquid crystal display panel 10 changes in response to the third gate timing control signal DRV3 every N frame periods or N seconds.

Figure 7B:
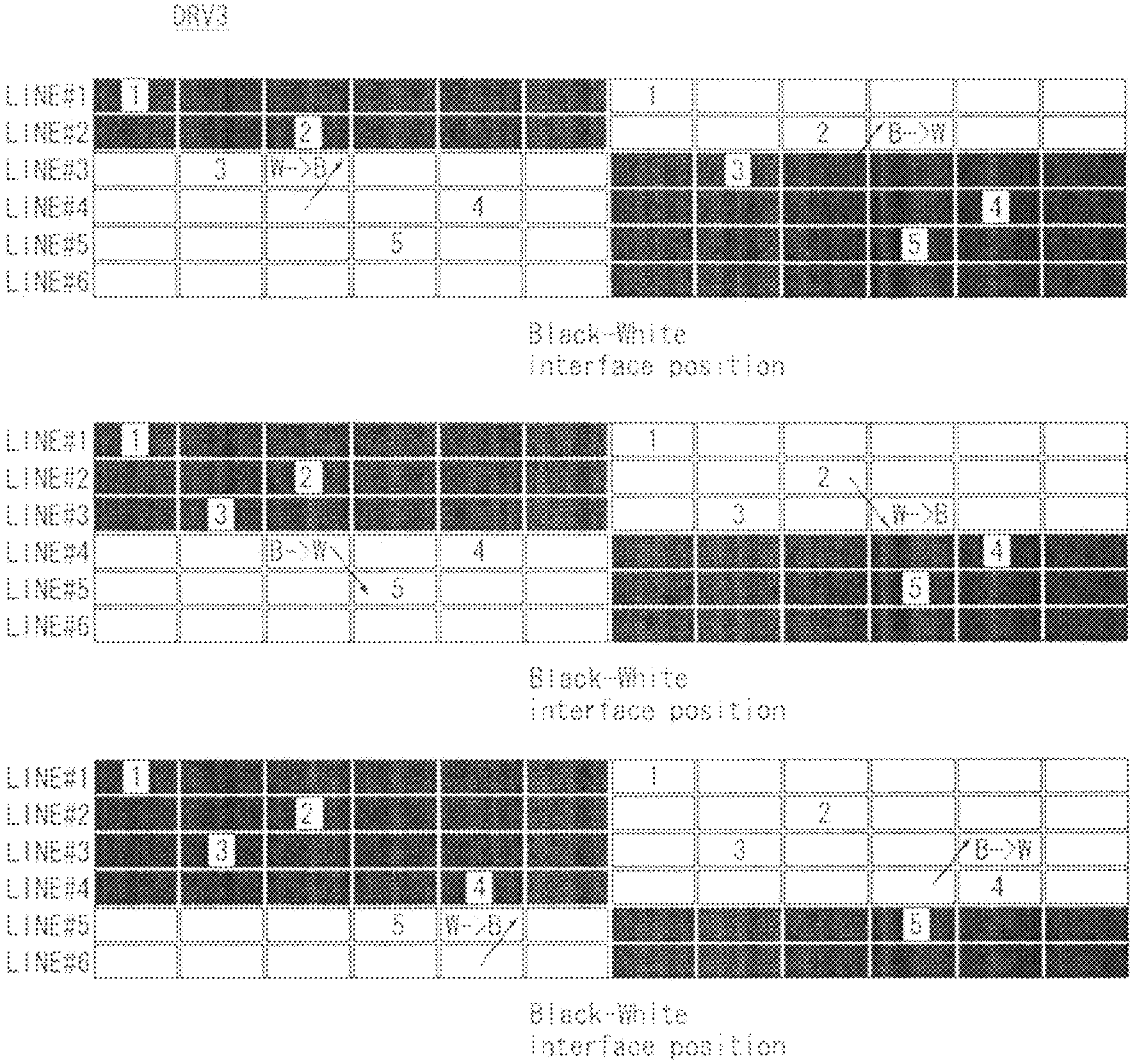
FIG. 7B shows a scan direction of the liquid crystal display panel driven by the third gate timing control signal of FIG. 7A when test data of a mosaic pattern is displayed on the liquid crystal display panel.

FIG. 7A is a waveform diagram of the third gate timing control signal DRV3. FIG. 7B shows a scan direction of the liquid crystal display panel 10 driven by the third gate timing control signal DRV3 when test data of a mosaic pattern is displayed on the liquid crystal display panel 10.

As show in FIG. 7A, the third gate timing control signal DRV3 is a control signal for alternately scanning the liquid crystal display panel 10 in the sequential direction and the reverse sequential direction.

In the third gate timing control signal DRV3, the gate start pulse GSP is once generated in the initial of 1 frame period when scan time starts. In the gate shift clock signal GSC, one pulse with a long width is generated within a first horizontal period, and then one pulse with a short width and one pulse with a long width are generated within a second horizontal period. Sequentially, after one pulse with a long width is generated within a third horizontal period, two pulses with a short width and one pulse with a long width are generated within a fourth horizontal period. The pulse waveform generated during the third and fourth horizontal periods is repeatedly generated during horizontal periods following the fourth horizontal period. The gate output enable signal GOE is generated in synchronization with a rising edge of the gate shift clock signal GSC. After the scan direction control signal DIR is maintained in a low logic state the first and second horizontal periods, the scan direction control signal DIR is generated in a high logic state during odd-numbered horizontal periods and is generated in a low logic state during even-numbered horizontal periods. A pulse width of the scan direction control signal DIR is larger than a pulse width of the gate shift clock signal GSC and has a pulse width corresponding to 1 horizontal period. A second half portion of each of pulses of the scan direction control signal DIR overlaps the pulses of the gate shift clock signal GSC generated during the other odd-numbered horizontal periods except the first horizontal period and pulses of the gate output enable signal GOE generated during the odd-numbered horizontal periods.

When the scan direction control signal DIR is generated in a low logic state, the gate drive circuit 13 shifts the gate pulses in the sequential direction from the top to the bottom of the screen. When the scan direction control signal DIR is generated in a high logic state, the gate drive circuit 13 shifts the gate pulses in the reverse sequential direction from the bottom to the top of the screen. The number of shift operations of the gate pulses is equal to the number of pulses of the gate shift clock signal GSC generated during 1 horizontal period. Accordingly, if the scan direction control signal DIR and the gate shift clock signal GSC are generated as shown in FIG. 7A, the gate drive circuit 13 shifts the gate start pulse GSP once in the sequential direction during the first horizontal period and supplies the gate pulse to the first gate line G1. Sequentially, after the gate drive circuit 13 shifts the gate pulse two times in the sequential direction during the second horizontal period and supplies the gate pulse to the third gate line G3, the gate drive circuit 13 shifts the gate pulse once in the reverse sequential direction during the third horizontal period and supplies the gate pulse to the second gate line G2. Sequentially, after the gate drive circuit 13 shifts the gate pulse three times in the sequential direction during the fourth horizontal period and supplies the gate pulse to the fifth gate line G5, the gate drive circuit 13 shifts the gate pulse once in the reverse sequential direction during the fifth horizontal period and supplies the gate pulse to the fourth gate line G4. The gate drive circuit 13 repeatedly performs the above-described operations, and thus supplies the gate pulses to the gate lines G1 to Gn in order of the (n−4)-th, (n−2)-th, (n−3)-th, n-th, and (n−1)-th gate lines.

Because the liquid crystal display and the method of driving the same according to the exemplary embodiment of the invention scan the liquid crystal display panel 10 while the scan direction of the liquid crystal display panel 10 changes every N frame periods or N seconds, the data voltage is shifted from a white gray level block to a black gray level block in an interface between the black gray level block and the white gray level block even if the liquid crystal display displays the mosaic pattern shown in FIG. 2A for a long time. As a result, the liquid crystal display and the method of driving the same according to the exemplary embodiment of the invention supply the gate pulses to the gate lines while the shift direction of the gate pulses changes, and thus can suppress the polarization of impurity ions inside the liquid crystal layer and can prevent the stains and the stain spreading.

Figure 8:
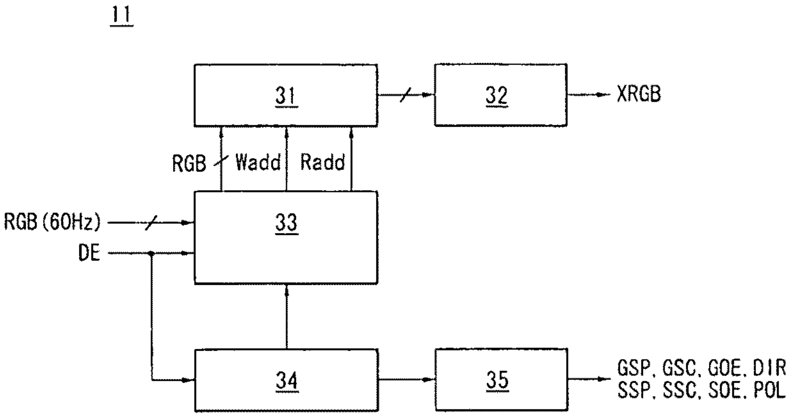
FIG. 8 shows a circuit of a timing controller for increasing a transmission frequency of digital video data and multiplying data and gate timing control signals.

FIG. 8 shows a circuit of the timing controller 11 for increasing a transmission frequency of the digital video data and multiplying the data and gate timing control signals.

As shown in FIG. 8, the timing controller 11 includes a memory 31, an interface transmitting unit 32, a memory controller 33, a frequency multiplier 34, and a timing control signal generating unit 35.

The memory 31 is implemented as a frame memory. The memory 31 stores the digital video data RGB in response to a write address signal Wadd generated based on the non-multiplied data enable signal DE and outputs the stored digital video data in response to a read address signal Radd, whose frequency rises, based on the multiplied data enable signal DE. The memory 31 successively outputs the same data two times during a first half period and a second half period of a multiplied frame period under the control of the memory controller 33.

The interface transmitting unit 32 transmits the digital video data XRGB output from the memory 31 and mini low-voltage differential signaling (LVDS) clock to the data drive circuit 12 in a mini LVDS manner. In case the data is transmitted in the mini LVDS manner, because a pulse following a reset pulse of the mini LVDS clock serves as the source start pulse SSP, the timing control signal generating unit 35 does not need to generate a separate source start pulse SSP.

Figure 9:
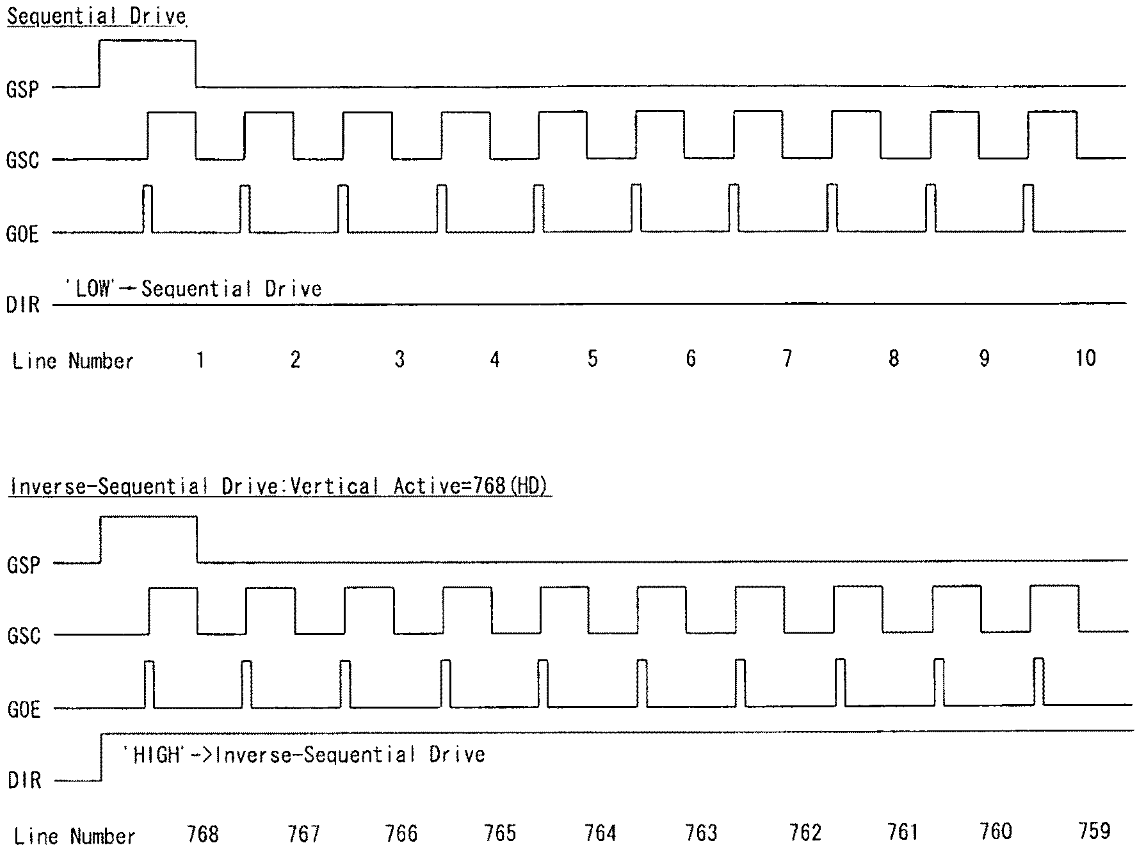
FIG. 9 is a waveform diagram of a fourth gate timing control signal.

The memory controller 33 generates the write address signal Wadd suitable for the input data enable signal DE and generates the read address signal Radd suitable for the data enable signal DE whose an input frequency is multiplied by 2. A reason why an output speed of the memory 31 increases is that the digital video data XRGB is supplied to the data drive circuit 12 when the liquid crystal display panel 10 is driven by the first gate timing control signal DRV1 during a first half period of a frame period as shown in FIG. 9, and then the same data XRGB has to be supplied to the data drive circuit 12 during a second half period of the frame period.

The frequency multiplier 34 multiplies a frequency of the data enable signal DE by 2. The data enable signal DE is generated every 1 horizontal period based on an input frame frequency of the data enable signal DE. For example, if the input frame frequency is 60 Hz, the liquid crystal display panel 10 is driven at a frame frequency of 120 Hz.

The timing control signal generating unit 35 generates the gate timing control signals GSP, GSC, GOE and DIR and the data timing control signals SSP, SSC, SOE and POL based on the data enable signal DE whose the frequency is multiplied by 2. Accordingly, frequencies of the gate and data timing control signals output from the timing control signal generating unit 35 is two times higher than frequencies of the gate and data timing control signals generated when the liquid crystal display panel 10 is driven at 60 Hz.

The liquid crystal display and the method of driving the same, according to the exemplary embodiment of the invention, drive the liquid crystal display panel 10 at 120 Hz by multiplying the frame frequency by 2, and time-divide 1 frame period corresponding to 1/60 sec into a first half sub-frame period and a second half sub-frame period to drive the liquid crystal display panel 10. Further, the liquid crystal display and the method of driving the same, according to the exemplary embodiment of the invention, apply the first gate timing control signal shown in the top of FIG. 9 to the gate driver ICs 131 during a first half sub-frame period of each frame period to control the scan direction in the sequential direction. Then, the liquid crystal display and the method of driving the same, according to the exemplary embodiment of the invention, apply the fourth gate timing control signal shown in the bottom of FIG. 9 to the gate driver ICs 131 to control the scan direction in the reverse sequential direction.

Figure 10:
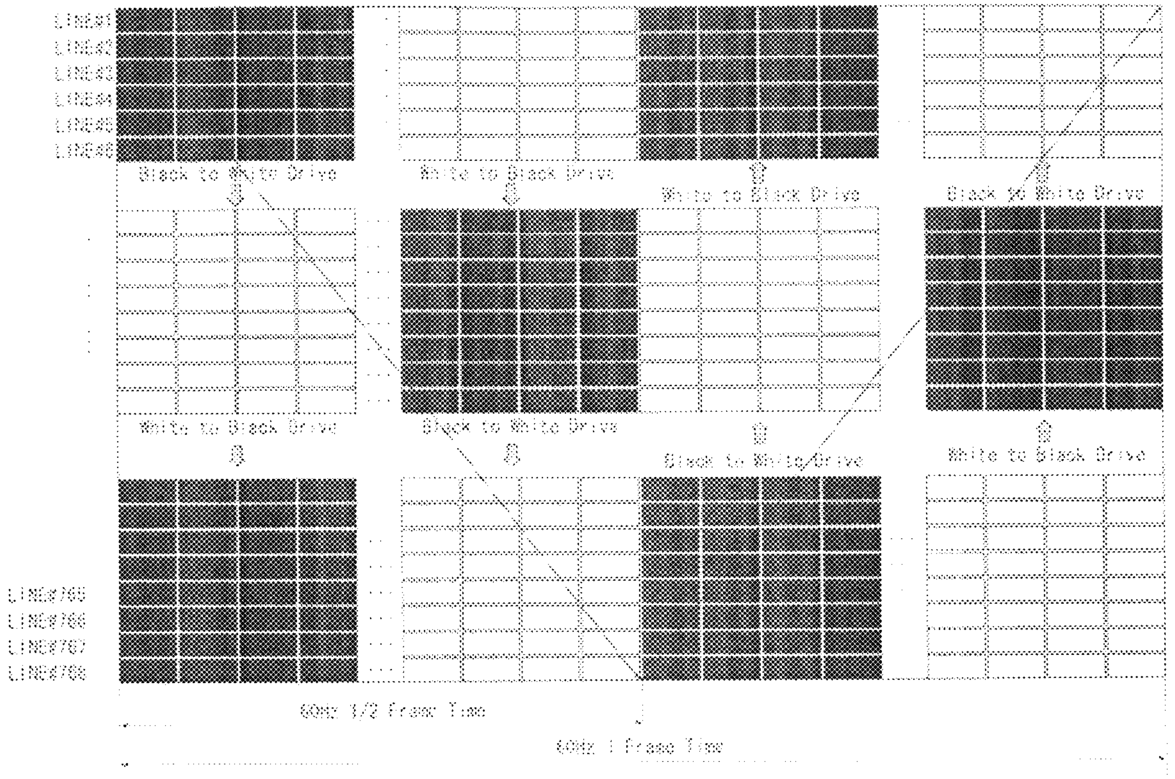
FIG. 10 is a timing diagram showing a data voltage of a mosaic pattern scanned by the fourth gate timing control signal of FIG. 9.

FIG. 9 shows first to fourth gate timing control signals. FIG. 10 shows a scan direction of the liquid crystal display panel 10 driven by the gate timing control signal of FIG. 9 when test data of a mosaic pattern is displayed on the liquid crystal display panel 10.

As shown in FIG. 9, the first gate timing control signal of FIG. 9 is substantially the same as the first gate timing control signal of FIG. 5 except that a frequency of the first gate timing control signal of FIG. 9 is higher than a frequency of the first gate timing control signal of FIG. 5. The fourth gate timing control signal controls a shift direction of the gate pulse in the reverse sequential direction from the bottom to the top of the screen. In other words, after the gate driver ICs 131 supply a gate pulse to a gate line of the last line LINE#768 in response to the fourth gate timing control signal, the gate driver ICs 131 shift the gate pulse upward by 1 line and lastly supply a gate pulse to a gate line of the first line LINE#1. A gate start pulse GSP, a gate shift clock signal GSC, and a gate output enable signal GOE of the fourth gate timing control signal are substantially the same as those of the first gate timing control signal. On the other hand, a scan direction control signal DIR of the fourth gate timing control signal is generated in a high logic state during the second half sub-frame period.

The liquid crystal display and the method of driving the same according to the exemplary embodiment of the invention scan the entire screen of the liquid crystal display panel in the sequential direction every 1 frame period as shown in FIG. 10, and then scan the entire screen in the reverse sequential direction. Hence, the data voltage is shifted from a white gray level block to a black gray level block in an interface between the black gray level block and the white gray level block even if the liquid crystal display displays the mosaic pattern shown in FIG. 2A for a long time. As a result, the liquid crystal display and the method of driving the same according to the exemplary embodiment of the invention supply the gate pulses to the gate lines while the shift direction of the gate pulses changes, and thus can suppress the polarization of impurity ions inside the liquid crystal layer and can prevent the stains and the stain spreading.

Although the exemplary embodiment of the invention has described the mosaic data as the test data, the exemplary embodiment of the invention may drive the liquid crystal display panel when general video data is displayed.

As described above, the liquid crystal display and the method of driving the same according to the exemplary embodiment of the invention periodically changes a method for scanning the liquid crystal display panel, and thus can suppress the polarization of impurity ions inside the liquid crystal layer and can prevent the stains and the stain spreading. Hence, the display quality of the liquid crystal display can be improved.

It will be apparent to those skilled in the art that various modifications and variations can be made in the embodiments of the invention without departing from the spirit or scope of the invention. Thus, it is intended that embodiments of the invention cover the modifications and variations of this invention provided they come within the scope of the appended claims and their equivalents.

What is claimed is:

1. A liquid crystal display comprising:

a liquid crystal display panel including a plurality of data lines, a plurality of gate lines crossing the data lines, and a plurality of liquid crystal cells arranged at each crossing of the data lines and the gate lines in a matrix format; and a timing controller that supplies digital video data and a plurality of data timing control signals to a data drive circuit, and a plurality of gate timing control signals to a gate drive circuit, the gate driving circuit is dividedly attached between a first side and a second side of the liquid crystal display panel;

wherein the plurality of gate timing control signals include a plurality of first gate line timing control signals for controlling a driving of the plurality of liquid crystal cells of the liquid crystal display panel in a sequential direction during a first frame period and a plurality of second gate line timing control signals for controlling a driving of the plurality of liquid crystal cells of the liquid crystal display panel in both a reverse sequential direction and in the sequential direction during a second frame period, wherein the data drive circuit supplies a data voltage to the plurality of data lines to the plurality of liquid crystal cells, wherein the gate drive circuit supplies a gate pulse to each of the plurality of gate lines to the plurality of liquid crystal cells, respectively, while a driving direction of the plurality of liquid crystal cells changes in response to a first and a second scan direction signals of the plurality of first and the second gate line timing control signals, respectively, wherein the gate drive circuit supplies the gate pulse to each of the plurality of gate lines in the sequential direction in response to the first scan direction signal to shift the gate pulse to the next adjacent gate line sequentially during the first frame period, wherein the gate drive circuit supplies the gate pulse to each of the plurality of gate lines in the sequential direction in response to the second scan direction signal while shifting the gate pulse by n (n is an integer) gate lines during the second frame period, and supplies the gate pulse to each of the plurality of gate lines in the reverse sequential direction in response to the second scan direction signal while shifting the gate pulse by m (m is an integer) gate lines during the second frame period, wherein the plurality of second gate line timing control signals comprises a gate shift clock signal which includes multiple pulses within a horizontal period, and wherein the gate drive circuit shifts the gate pulse to a non-adjacent gate line during the second frame period, a shift corresponding to the number of multiple pulses.

2. The liquid crystal display of claim 1, wherein the plurality of gate lines include a first to a fourth gate lines sequentially positioned on the liquid crystal display panel, and the gate drive circuit sequentially supplies the gate pulses to the first to the fourth gate lines in order of the second, the first, the fourth, and the third gate lines in response to the second gate line timing control signal.

3. The liquid crystal display of claim 1, wherein the plurality of gate lines include a first to a third gate lines sequentially positioned on the liquid crystal display panel, and the gate drive circuit sequentially supplies the gate pulses to the first to the third gate lines in order of the first, the third, and the second gate lines in response to the second gate line timing control signal.

4. The liquid crystal display of claim 1, further comprising:

a memory that stores the digital video data and transmits the stored digital video data to the data drive circuit;

a frequency multiplier that multiplies a frame frequency of an input timing signal, by 2; and a memory controller that raises a transmission frequency of the digital video data output from the memory based on the input timing signal, wherein a timing control signal generating unit raises a first gate line timing control frequency and a second gate line time control frequency of the first and the second gate timing control signals, respectively, to be suitable for the frame frequency based on the input timing signal.

5. The liquid crystal display of claim 4, wherein the liquid crystal display panel displays an image in a frame period, the frame period is time-divided into a first half sub-frame period and a second half sub-frame period, the first gate line timing control signal is generated during the first half sub-frame period and includes the first scan direction signal, that is maintained in a low logic state, for controlling the driving direction of the plurality of liquid crystal cells of the liquid crystal display panel in the sequential direction, and the second gate line timing control signal is generated during the second half sub-frame period and includes the second scan direction signal, that is maintained in a high logic state, for controlling the driving direction of the plurality of liquid crystal cells of the liquid crystal display panel in the reverse sequential direction.

6. A method of driving a liquid crystal display including a liquid crystal display panel including a plurality of data lines, a plurality of gate lines crossing the data lines, and a plurality of liquid crystal cells arranged at each crossing of the data lines and the gate lines in a matrix format, a data drive circuit that supplies a data voltage to each of the plurality of data lines, and a gate drive circuit that supplies a gate pulse to each of the plurality of gate lines, the method comprising:

generating a plurality of first gate line timing control signals for controlling driving of the plurality of liquid crystal cells of the liquid crystal display panel in a sequential direction during a first frame period and a plurality of second gate line timing control signals for controlling a driving of the plurality of liquid crystal cells of the liquid crystal display panel in both a reverse sequential direction and in the sequential direction during a second frame period; and supplying the first and the second gate line timing control signals to control terminals of the gate drive circuit to supply the gate pulse to each of the plurality of gate lines while a driving direction of the gate pulse changes, wherein the gate pulse is supplied to each of the plurality of gate lines in the sequential direction in response to a first scan direction signal of the plurality of first gate line timing control signals while shifting the gate pulse to the next adjacent gate line during the first frame period, and wherein the gate pulse is supplied to each of the plurality of gate lines in the sequential direction in response to a second scan direction signal of the plurality of second gate line timing control signals while shifting the gate pulse by n (n is an integer) gate lines during the second frame period, and supplies the gate pulse to each of the plurality of gate lines in the reverse sequential direction in response to the second scan direction signal while shifting the gate pulse by m (m is an integer) gate lines during the second frame period, wherein the plurality of second gate line timing control signals comprises a gate shift clock signal which includes multiple pulses within a horizontal period, and wherein the gate drive circuit shifts the gate pulse to a non-adjacent gate line during the second frame period, a shift corresponding to the number of the multiple pulses.

7. The method of claim 6, further comprising:

multiplying a frame frequency of an input timing signal to the data drive circuit, by 2;

storing digital video data based on the frame frequency to transmit the digital video data, wherein a data transmission frequency of the digital video data increases based on the frame frequency of the input timing signal to the data drive circuit; and raising a first gate line timing control frequency and a second gate line time control frequency of the first and the second gate line timing control signals, respectively, to be suitable for the frame frequency based on the input timing signal.

8. The method of claim 7, wherein the liquid crystal display panel displays an image in a frame period, the frame period is time-divided into a first half sub-frame period and a second half sub-frame period, the plurality of first gate line timing control signals are generated during the first half sub-frame period and includes the first scan direction signal, that is maintained in a low logic state, for controlling the scan direction of the plurality of liquid crystal cells of the liquid crystal display panel in the sequential direction, and the plurality of second gate line timing control signals are generated during the second half sub-frame period and includes the second scan direction signal, that is maintained in a high logic state, for controlling the scan direction of the plurality of liquid crystal cells of the liquid crystal display panel in the reverse sequential direction.

9. The method of claim 6, wherein the plurality of gate lines include a first to a fourth gate lines sequentially positioned on the liquid crystal display panel, and the gate pulse to the plurality of gate lines is sequentially supplied to the first to the fourth gate lines in order of the second, the first, the fourth, and the third gate lines.

10. The method of claim 6, wherein the plurality of gate lines include a first to a third gate lines sequentially positioned on the liquid crystal display panel, and the gate pulse to the plurality of gate lines is sequentially supplied to the first to the third gate lines in order of the first, the third, and the second gate lines.

11. The method of claim 6, further comprising:

storing digital video data in a memory and transmitting the stored digital video data to the data drive circuit;

multiplying a frame frequency of an input timing signal, by 2;

raising a transmission frequency of the digital video data output from the memory based on the input timing signal; and raising a first gate line timing control frequency and a second gate line time control frequency of the plurality of first and the second gate line timing control signals, respectively, to be suitable for the frame frequency based on the input timing signal.

12. The method of claim 11, wherein the liquid crystal display panel displays an image in a frame period, the frame period is time-divided into a first half sub-frame period and a second half sub-frame period, the plurality of first gate line timing control signals are generated during the first half sub-frame period and includes the first scan direction control signal, that is maintained in a low logic state, for controlling the scan direction of the plurality of liquid crystal cells of the liquid crystal display panel in the sequential direction, and the plurality of second gate line timing control signals are generated during the second half sub-frame period and includes the second scan direction control signal, that is maintained in a high logic state, for controlling the scan direction of the plurality of liquid crystal cells of the liquid crystal display panel in the reverse sequential direction.

* * * * *